(12) United States Patent
Lukas et al.

(10) Patent No.: US 11,953,810 B2
(45) Date of Patent: Apr. 9, 2024

(54) HOLDING DEVICE FOR A CAMERA (71) Applicant: CINETICA GMBH, Munich (DE)

(72) Inventors: Andreas Lukas, Munich (DE); Matthias Müller, Munich (DE); Jan Riepert, Munich (DE); Tojan Bieber, Munich (DE)

(73) Assignee: Cinetica GmbH, Munich (DE)

( * ) Notice: Subject to any disclaimer, the term of this patent is extended or adjusted under 35 U.S.C. 154(b) by 90 days.

(21) Appl. No.: 17/612,864

(22) PCT Filed: May 20, 2020

(86) PCT No.: PCT/EP2020/064088
§ 371 (c)(1),
(2) Date: Nov. 19, 2021

(87) PCT Pub. No.: WO2020/234360
PCT Pub. Date: Nov. 26, 2020

(65) Prior Publication Data
US 2022/0229350 A1    Jul. 21, 2022

(30) Foreign Application Priority Data

May 20, 2019   (DE) ...................... 10 2019 113 301.7
Apr. 3, 2020   (DE) ...................... 20 2020 101 821.3

(51) Int. Cl.
*G03B 17/56* (2021.01)
*F16M 11/04* (2006.01)
(Continued)

(52) U.S. Cl.
CPC ......... *G03B 17/561* (2013.01); *F16M 11/046* (2013.01); *F16M 11/048* (2013.01);
(Continued)

(58) Field of Classification Search
CPC .. G03B 17/561; F16M 11/046; F16M 11/048; F16M 11/18; F16M 11/2014; F16M 2200/041; F16M 2200/063; F16M 2200/08
(Continued)

(56) References Cited

U.S. PATENT DOCUMENTS 2,548,476 A * 4/1951 Norris ..................... F21V 21/26
248/123.2
5,192,963 A * 3/1993 Hill ........................ F16M 11/42
396/428
(Continued)

FOREIGN PATENT DOCUMENTS

CN    101539234          9/2009
CN    101539234 A    *  9/2009 ............. F16M 11/16
(Continued)

OTHER PUBLICATIONS

International Search Report issued by the European Patent Office in International Application PCT/EP2020/064088.
(Continued)

*Primary Examiner* — Stephanie E Bloss
*Assistant Examiner* — Kevin C Butler
(74) *Attorney, Agent, or Firm* — Henry M. Feiereisen LLC (57) ABSTRACT

A holding and moving device includes a support foot, a bearing arm secured pivotably onto the support foot to form a useful load side section and a weight-side section, a first pivot arm connected to the useful load side section of the bearing arm for attachment of a useful load and/or holding device for a useful load, and a second pivot arm connected to the weight-side section of the bearing arm for attachment of a balance weight. The bearing arm and the first and second pivot arms are connected to one another such that the
(Continued)

alignment of the first and second pivot arms are essentially parallel to one another in each position. The second pivot arm and/or the weight-side section are designed such that the weight of the first pivot arm and/or of the useful load side section is balanced in each position of the holding and moving device.

24 Claims, 7 Drawing Sheets

(51) Int. Cl.
    *F16M 11/18*     (2006.01)
    *F16M 11/20*     (2006.01)

(52) U.S. Cl.
    CPC ......... *F16M 11/18* (2013.01); *F16M 11/2014* (2013.01); *F16M 2200/041* (2013.01); *F16M 2200/063* (2013.01); *F16M 2200/08* (2013.01)

(58) Field of Classification Search
    USPC .......................................................... 396/428
    See application file for complete search history.

(56) References Cited

U.S. PATENT DOCUMENTS

| | | | | |
|---|---|---|---|---|
| 5,531,412 A | * | 7/1996 | Ho | ..................... F16M 11/2092 |
| | | | | 396/428 |
| 8,006,850 B2 | * | 8/2011 | Rotheisler | ............... B66C 23/14 |
| | | | | 212/196 |
| 2009/0236484 A1 | * | 9/2009 | Koch | ..................... F16M 11/16 |
| | | | | 248/276.1 |
| 2010/0193457 A1 | * | 8/2010 | Rotheisler | ............. B66F 11/048 |
| | | | | 248/178.1 |
| 2013/0034347 A1 | * | 2/2013 | Randy | .................. G03B 17/561 |
| | | | | 396/428 |
| 2014/0291457 A1 | * | 10/2014 | Rotheisler | ............ G03B 17/561 |
| | | | | 248/123.2 |
| 2022/0229350 A1 | * | 7/2022 | Lukas | .................. G03B 17/561 |

FOREIGN PATENT DOCUMENTS

| | | | | |
|---|---|---|---|---|
| DE | 102008015210 A1 | * | 9/2009 | ............. F16M 11/16 |
| DE | 102008015210 A1 | | 9/2009 | |
| DE | 102019113301 A1 | * | 11/2020 | ........... F16M 11/046 |
| EP | 2391571 B1 | * | 11/2015 | ............. B66C 23/14 |
| EP | 2391571 B1 | | 11/2015 | |
| WO | WO-2020234360 A1 | * | 11/2020 | ........... F16M 11/046 |

OTHER PUBLICATIONS

Chinese Search Report dated Dec. 14, 2022 with respect to counterpart Chinese patent application 2020800379632.
Translation of Chinese Search Report dated Dec. 14, 2022 with respect to counterpart Chinese patent application 2020800379632.

* cited by examiner

HOLDING DEVICE FOR A CAMERA

CROSS-REFERENCES TO RELATED APPLICATIONS

This application is the U.S. National Stage of International Application No. PCT/EP2020/064088, filed May 20, 2020, which designated the United States and has been published as International Publication No. WO 2020/234360 A1 and which claims the priorities of German Patent Applications, Serial No. 10 2019 113 3011, filed May 20, 2019 and 20 2020 101 821.3, filed Apr. 3, 2020, pursuant to 35 U.S.C. 119(a)-(d).

BACKGROUND OF THE INVENTION

The invention relates to a holding and moving device for a useful load, in particular a camera, which enables dynamic weight balancing.

There are many different camera holding devices which hold and move the camera when filming. A problem is that previous camera moving devices are restricted in their freedom of movement, and thus camera cranes move the camera only on the outside surface of a ball for example. Other camera cranes provide additional freedom of movement. However, the problem here is that the dynamic equilibrium is not independent of the position of the movement arm. In particular, if the medium height position of the useful load and/or the counterweight is departed from when pivoting, an imbalance can be caused by disproportional inherent weights. Such solutions provide equilibrium only in an approximately central position in which the position of the camera and balance weight are aligned to be approximately horizontal. Positions with a greater deflection of the camera in vertical direction or divergences close to the base point can therefore not be approached without a loss of equilibrium.

Such a suspension device is disclosed for example in U.S. Pat. No. 5,192,963 A, which enables a user to perform camera movements without having to continually support the weight of the camera. The device comprises a yoke which is mounted rotatably on a base provided with wheels for rotation about a vertical axis. A primary lever arm with a first and a second end and a central section is arranged pivotably on the yoke to form a rotation point. A secondary arm has a first end, which is secured pivotably at the second end of the primary lever arm, and a second end which has a holder for the camera. A balance weight arm has a first end, which is secured pivotably to the first end of the primary lever arm. To ensure the equilibrium, the device comprises a chain drive mechanism, which responds to the pivoting of the secondary arm about the second end of the primary lever arm in a first direction, in order to pivot the balance weight arm about the first end of the primary lever arm in a second direction. Furthermore, the device comprises a chain drive mechanism for keeping the camera level relative to the base, when the secondary arm is pivoted about the second end of the primary lever arm.

The problem with this arrangement is that no dynamic weight balancing is provided. As soon as the camera leaves an approximate position at a central height, the balance weight can no longer balance the camera weight with sufficient precision and there is an imbalance, so that the weight of the camera still has to be supported by the user.

EP 2391571 B1 discloses an articulated extension arm for moving a load, wherein the extension arm is mounted on a base and the extension arm comprises a first arm, which is pivotably connected to the base, wherein the first arm functions as a bascule and is pivotable about a first axis, and a second arm, which is connected pivotably to the first arm, wherein the second extension arm is pivotable about a second axis, wherein the first and the second arm each comprise two parallel frame bars, wherein each of the frame bars of the first arm is pivotably connected to the base and are spaced apart from one another by an elbow spacer at one of the said elbow ends of the first arm adjacent to the second arm and by at least one central mounting plate, which is pivotably connected to the first arm between the elbow end and an opposite distal end, and wherein the frame bars of the first arm are connected to the two parallel frame bars of the second arm, in order to form a parallelogram linking mechanism at the elbow end. Furthermore, the articulated extension arm comprises a lever arm, which is pivotably connected to the central mounting plane at its lower end in order to have a fixed distance from the central mounting pate, a connecting rod connecting the lever arm to the second arm, a first balance weight, which is arranged at the distal end of the first arm and a second balance weight, which is arranged at an upper end of the lever arm. Also in this arrangement the equilibrium is only provided in an approximate central position of the camera. A dynamic equilibrium is not achieved.

The objective of the present invention is to provide an easy-to-use holding device with an uncomplicated construction, which enables a dynamic and precise weight balancing for different useful loads, such as cameras. In particular, the objective of the present invention is to provide a holding and moving device, which enables almost perfect dynamic balancing. Dynamic balancing can be understood as balancing that is independent of the position of the individual pivot arms and during movement, even without a useful load. Thus, free positioning of the useful load can be possible at any location of the achievable spatial volume without the useful load having to be supported by the user. This objective is achieved by a holding and moving device as set, forth hereinafter. Further features of the invention are given in the subclaims.

SUMMARY OF THE INVENTION

According to a first aspect the holding and moving device according to the invention for a useful load, in particular a camera, comprises a support foot, a bearing arm, which is secured pivotably to the support foot, so that a useful load side section (e.g. a useful load side end region) and a weight-side section (e.g. a weight-side end region) are formed (for example protrude beyond the fastening), a first pivot arm, which is connected on the useful load side to the useful load side section of the bearing arm and to which a useful load, in particular a camera, and/or a holding device for a useful load can be attached or is attached, and a second pivot arm, which is connected on the weight side to the weight-side section of the bearing arm and can be attached or is attached to the at least one balance weight, wherein the bearing arm, the first pivot arm and the second pivot arm are connected to one another such that the alignment of the first and the second pivot arm are essentially parallel to one another in each position, wherein the centre of gravity of the weight side, the centre of gravity of the useful load side and the fastening point of the bearing arm on the support foot are essentially in a straight line.

According to a second aspect the holding and moving device according to the invention for a useful load comprises a support foot, a bearing arm, which is secured pivotably to the support foot, so that a useful load section and a weight-side section are formed, a first pivot arm, which is connected on the useful load side to the useful load side section of the bearing arm and to which a useful load and/or a holding device for a useful load can be attached or is attached, and a second pivot arm, which is connected on the weight side to the weight-side section of the bearing arm and to which at least one balance weight can be attached or is attached, wherein the bearing arm, the first pivot arm and the second pivot arm are connected to one another such that the orientation of the first and of the second pivot arm are essentially parallel to one another in each position, wherein the ratio of the distance of the connecting point of the first pivot arm on the bearing arm to the fastening point of the useful load or the holding device on the first pivot arm to the distance of the fastening point of the bearing arm on the support foot to the connecting point of the first pivot arm on the bearing arm is essentially equal to the ratio of the distance of the connecting point of the second pivot arm on the bearing arm to the centre of gravity and/or attachment point of the balance weight on the second pivot arm to the distance of the fastening point of the bearing arm on the support foot to the connecting point of the second pivot arm on the bearing arm.

According to a third aspect the holding and moving device according to the invention for a useful load comprises a support foot, a bearing arm, which is secured pivotably to the support foot, so that a useful load side section and a weight-side section are formed, a first pivot arm, which is connected on the useful load side to the useful load side section of the bearing arm and to which a useful load and/or a holding device for a useful load can be attached or is attached, and a second pivot arm, which is connected on the weight side to the weight-side section of the bearing arm and to which at least one balance weight can be attached or is attached, wherein the bearing arm, the first pivot arm and the second pivot arm are connected to one another such that the orientation of the first and of the second pivot arm are essentially parallel to one another in each position, wherein the weight-side second pivot arm and/or the weight-side bearing arm section are configured such that the weight of the useful load side first pivot arm and/or of the useful load side bearing arm section is balanced in each position of the holding and moving device.

The ratio of the distance of the connecting point of the first pivot arm on the bearing arm to the fastening point of the useful load or the holding device on the first pivot arm to the distance of the fastening point of the bearing arm on the support foot to the connecting point of the first pivot arm on the bearing arm can be essentially equal to the ratio of the distance of the connecting point of the second pivot arm on the bearing arm to the centre of gravity and/or attachment point of the balance weight on the second pivot arm to the distance of the fastening point of the bearing arm on the support foot to the connecting point of the second pivot arm on the bearing arm.

The weight-side second pivot arm and/or the weight-side bearing arm section can be designed such that the weight of the useful load side first pivot arms and/or of the useful load side bearing arm section is balanced, in particular in each position of the holding and moving device.

The centre of gravity (e.g. overall centre of gravity) of the weight side, the centre of gravity (e.g. overall centre of gravity) of the useful load side and the fastening point of the bearing arm on the support foot can be essentially in a straight line.

The orientation can be defined in general by a connecting line between two points, in particular imaginary and/or straight, such as articulated axes or connecting points, of the respective element. The orientation can be defined by the central axis or longitudinal axis of the respective element. All geometric references, alignments, distances, lengths and/or positions can be seen as defined in a two-dimensional view, such as a side view, of the holding and moving device. The orientation of the first pivot arm can be defined by an, in particular straight, connecting line between the connecting point of the first pivot arm on the bearing arm, in particular on the useful load side section, and the fastening point of the useful load or the holding device on the first pivot arm. The orientation of the useful load side section of the bearing arm can be defined by an, in particular straight, connecting line between the fastening point of the bearing arm, in particular of the useful load side section, on the support foot and the connecting point of the first pivot arm on the bearing arm, in particular on the useful load side section. The orientation of the second pivot arm can be defined by an, in particular straight, connecting line between the connecting point of the second pivot arm on the bearing arm, in particular on the weight-side section, and the centre of gravity and/or attachment point of the balance weight, in particular of the balance weight for the useful load, on the second pivot arm. The orientation of the weight-side section of the bearing arm can be defined by an, in particular straight, connecting line between the fastening point of the bearing arm, in particular of the weight-side section, on the support foot and the connecting point of the second pivot arm on the bearing arm, in particular on the weight-side section. The points, connecting points, fastening points and/or attachment points can be defined by articulation points and/or axes of rotation. The axes of rotation can be perpendicular to a two-dimensional view, such as a side view, of the holding and moving device. The bearing arm, the first pivot arm and/or the second pivot arm can be designed to be geometrically and/or structurally different. The holding and moving device can be arranged to be vertical. The support foot can be arranged to be vertical. The support foot can be anchored in the ground or in the ceiling. The support foot can be arranged on a movement device, for example a trolley or the like. The support foot can be arranged on a tripod, such as a camera tripod. The bearing arm, the first pivot arm and the second pivot arm can essentially define and/or form a Z shape. The formed Z shape can be aligned or oriented to be essentially vertical. The formed Z shape can extend essentially in a vertical plane or be aligned in therein.

The distance of the connecting point of the first pivot arm on the bearing arm to the fastening point of the useful load or the holding device on the first pivot arm and the distance of the fastening point of the bearing arm on the support foot to the connecting point of the first pivot arm on the bearing arm can be essentially of equal length. The first pivot arm and the useful load side section of the bearing arm can be essentially of equal length. The distance of the connecting point of the first pivot arm on the bearing arm to the fastening point of the useful load or the holding device on the first pivot arm can be greater or smaller than the distance of the fastening point of the bearing arm on the support foot to the connecting point of the first pivot arm on the bearing arm. The length of the first pivot arm can be greater or smaller than the length of the useful load side section of the bearing arm.

The distance of the connecting point of the second pivot arm on the bearing arm to the centre of gravity and/or attachment point of the balance weight on the second pivot arm and the distance of the fastening point of the bearing arm on the support foot to the connecting point of the second pivot arm on the bearing arm can be essentially of equal length. The second pivot arm and the weight-side section of the bearing arm can be essentially of equal length. The distance of the connecting point of the second pivot arm on the bearing arm to the centre of gravity and/or attachment point of the balance weight on the second pivot arm can be greater or smaller than the distance of the fastening point of the bearing arm on the support foot to the connecting point of the second pivot arm (40) on the bearing arm (20). The length of the second pivot arm can be greater or smaller than the length of the weight-side section of the bearing arm.

The useful load can be a camera, e.g. for photography and/or video recording. The holding and moving device can be a camera holding and moving device. The orientation of the first and the orientation of the second pivot arm can be parallel to one another in each position. The overall centre of gravity of the weight side, the overall centre of gravity of the useful load side and the fastening point of the bearing arm on the support foot can be essentially in a straight line, preferably in each position of the holding and movement device. Generally, the centre of gravity or overall centre of gravity can comprise or be formed or defined by both the inherent weight of the respective pivot arm, the inherent weight of the respective useful load or weight-side section of the bearing arm, the respective balance weight or balance weights, the inherent weight of the holding device for the useful load and/or the useful load (e.g. camera). The centre of gravity or overall centre of gravity of the weight side can comprise or be formed or defined by the inherent weight of the weight-side second pivot arm, the inherent weight of the weight-side section of the bearing arm and/or at least one weight-side balance weight. The centre of gravity or overall centre of gravity of the useful load side can comprise or be formed or defined by the inherent weight of the useful load side first pivot arm, the inherent weight of the useful load side section of the bearing arm, the inherent weight of the holding device for the useful load and/or the inherent weight of the useful load. Preferably, the useful load can have its centre of gravity, such as its inherent centre of gravity, in the fastening point of the useful load on the first pivot arm. The centre of gravity or inherent centre of gravity of the useful load can be formed, arranged, mounted and/or defined, even with a vertical and/or horizontal deflection or attachment of the useful load, at the fastening point of the useful load on the first pivot arm. Due to the fact that the centres of gravity are in straight line and/or the inherent loads of the structure are taken into account, it is ensured that an almost perfect dynamic balancing of the holding device is provided, i.e. balancing which is independent of the position of the individual pivot arms and during the movement of the holding device. An optimal balance can be achieved in particular when the inherent loads of the holding and moving device and/or the useful load is/are balanced for example by a balance weight or by balance weights. Thus a free positioning of the useful load/camera at each location of the achievable room volume is possible without the useful load/camera having to be supported by the user. It is also possible achieve extreme positions such as far upwards, far outwards and far downwards. The weight side is the side, which is arranged in relation to the connecting point of the bearing arm with the support foot on the side of the balance weight. The useful load side is the side, which is arranged accordingly on the side of the useful load. The useful load is in particular a camera, but also a light, a photographic device or similar devices can be used as a useful load. A useful load can also be a medical device or instrument.

The second pivot arm can also comprise a holding device for a balance weight for the useful load/camera. The second pivot arm can comprise a holding device for a balance weight for the useful load side first pivot arm and/or the useful load side bearing arm section. The second pivot arm can comprise at least one balance weight which is predetermined according to the useful load/camera. The balance weight predetermined according to the useful load/camera can be secured in a variable position along the second pivot arm. The second pivot arm can comprise at least one balance weight predetermined according to the inherent weight of the useful load side first pivot arm and/or of the useful load side bearing arm section. A balance weight can be formed by the structure of the bearing arm, in particular the weight-side section of the bearing arm, and/or the second pivot arm. A balance weight to be attached can be replaced by the structure of the corresponding arm or section, which corresponds in weight and/or position of the inherent centre of gravity to the sum and/or result of the component-inherent weight with its centre of gravity and the calculated or predetermined balance weight with its centre of gravity. By means of the weight balancing, which is performed either by such a predefined structural design of the bearing and pivot arms together with the variable camera/useful load balance weight or by the movable weight, the dynamic balancing can be achieved in a simple way. The bearing arm and/or the pivot arms can be designed as multiple parts, for example in two parts, however they can be constructed to be stationary and secure against rotation, so that the respective arm/element always moves as a whole.

Preferably, the support foot can be fixed in relation to the respective pivot arm on a first longitudinal side (e.g. a first end) of the, in particular multipart, i.e. two-part bearing arm. The first and the second pivot arm can be secured on the respective opposite longitudinal side (e.g. at the opposite ends) of the bearing arm. In this way it can be avoided that the moving space of the pivot arms overlaps with the support foot. This can then be the case in particular, if the bearing arm is formed by a plurality of elements, for example two elements, and the weight-side section of the bearing arm is formed relative to the support foot on the opposite side as the useful load section of the bearing arm. Then also the two pivot arms do not interfere with one another in movement.

The orientation of the holding device for the useful load and/or the holding device for the balance weight for the useful load can be controlled in such a way that it balances the movement of the pivot arms. This can be achieved in particular by a separate mechanical, hydraulic or electromechanical control. In this way, it is possible to avoid unsteady shots when pivoting the camera. Furthermore, the useful load can always maintain the same orientation regardless of the rotation/pivoting of the pivot arms. This can be helpful for example when guiding the useful load, e.g. camera guiding, and when attaching and using the useful load or different useful loads.

The centre of gravity and/or holding point/suspension point for the useful load/camera and/or for the holding device for the useful load/camera, the centre of gravity and/or holding point for the balance weight for the useful load/camera and the fastening point of the bearing arm on the support foot can be or are arranged essentially in a straight line preferably in each position of the holding and moving device. The centre of gravity of the first pivot arm, the centre of gravity of the second pivot arm and the connecting point of the bearing arm on the support foot can be essentially in a straight line, preferably in each position of the holding and movement device. This can provide a simple way for the weight and useful load side weight distribution to be achieved with extreme precision.

The useful load/camera can preferably be attached to a lateral, horizontal and/or vertical extension arm provided for this purpose. The holding device for the useful load/camera can be designed as a lateral, horizontal and/or vertical extension arm. On a lateral and/or horizontal extension arm next to the suspension point it is less likely that the useful load/camera can collide with other components of the holding and moving device.

The pivot arms and/or the bearing arm can preferably be connected to each other movably via chain hoists, belts, cable hoists, electric motors and/or hydraulic rotary drives. In this way a simultaneous and mutually aligned movement of the individual elements can be ensured.

BRIEF DESCRIPTION OF THE DRAWING

In the following, exemplary embodiments of the invention are described in more detail with reference to the figures, which show schematically and by way of example.

DETAILED DESCRIPTION OF PREFERRED EMBODIMENTS

All geometric references, orientations, distances, lengths and/or positions can be seen or defined in a two-dimensional view of the holding and moving device. In FIGS. 3a to 4c and 6a to 6c this is the two-dimensional side view of the holding and moving device, which corresponds to the plane of the drawing. The axes of rotation of all articulation points are here always perpendicular to the two-dimensional plane of the drawing.

FIGS. 1 to 3c show an isometric representation of a first embodiment of a holding and moving device 10 of the present invention. The holding and moving device 10 generally comprises a support foot 12, a bearing arm 20, a first useful load side pivot arm 30 and a second weight-side pivot arm 40. In the following description a camera is used as the useful load by way of example.

The support foot 12 is depicted here as rod-like. Preferably, the support foot 12 is mobile, i.e. it can be raised and/or adjusted so that the position of the holding and moving device 10 can be changed. The support foot 12 can have rollers for this purpose. The standing surface 14 is shown schematically in the figures as a cone or cylinder. Generally however also 3 or more supporting legs can be used. However also a fixed support foot can be used in the present invention, which is screwed for example to the base via a flange. At its upper end the support foot 12 is connected at a connecting point V1 to the bearing arm 20. The connecting point of the bearing arm 20 with the support foot 12 is preferably mounted rotatably, so that the bearing arm 20 can rotate about the support foot 12 in a plane which is perpendicular to the longitudinal axis of the support foot 12, and/or can rotate in a Wane which is parallel to the longitudinal axis of the support foot 12 and/or in which the longitudinal axis of the support foot 12 lies.

The connecting point V1 of the bearing arm 20 with the support foot 12 divides the bearing arm 20 into two regions: a camera-side region K and a weight-side region G. The bearing arm 20 can be designed in one piece (i.e. made as only one piece) and/or can be arranged only on one side of the support foot 12. In the shown embodiment, the bearing arm 20 consists of multiple parts, in particular two parts. In region K and in region G respectively a separate section/element 24, 26 of the bearing arm 20 is provided which are connected to one another by a crossbar 22 (see FIG. 5). The elements 24, 26 are connected to one another so that they are secure against movement. The support foot 12 supports the bearing arm 20 on the crossbar 22 such that the camera-side element/section 24 is arranged relative to the support foot 12 on the opposite side than the weight-side element/section 26. In this way the pivot arms 30, 40 cannot impede one another, as they are arranged on different sides of the support foot 12. However, it is an advantage if only the pivot arms 30, 40 are provided on the longitudinal side of the bearing arm 20 opposite the support foot 12. In this way at least any hindrance to the movement of the pivot arms 30, 40 by the support foot 12 can be avoided.

Figure 1:
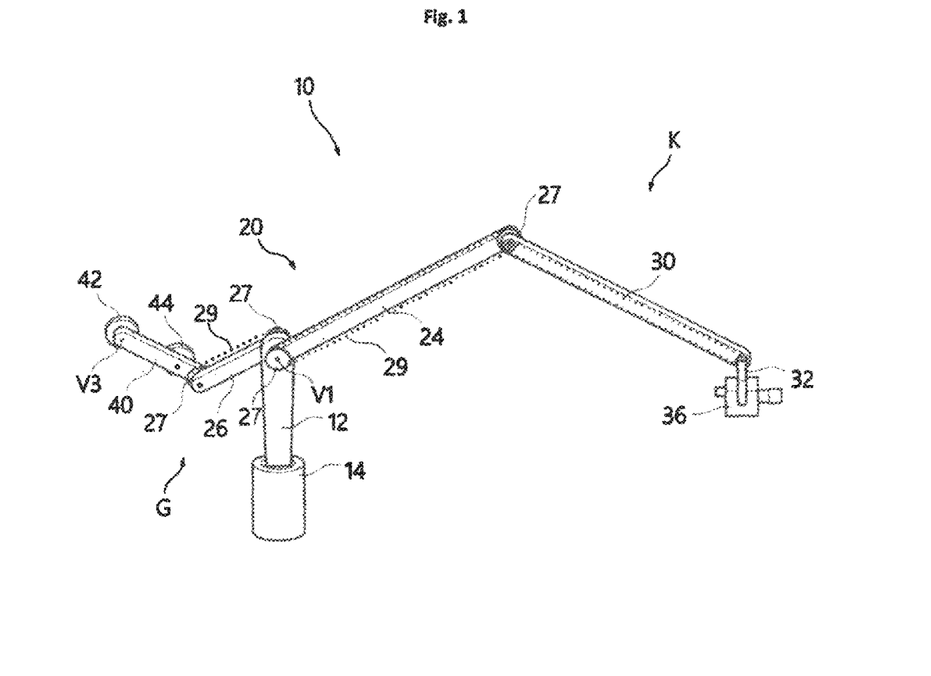
FIG. 1 an isometric representation of a holding and moving device according to the present invention.
Figure 2:
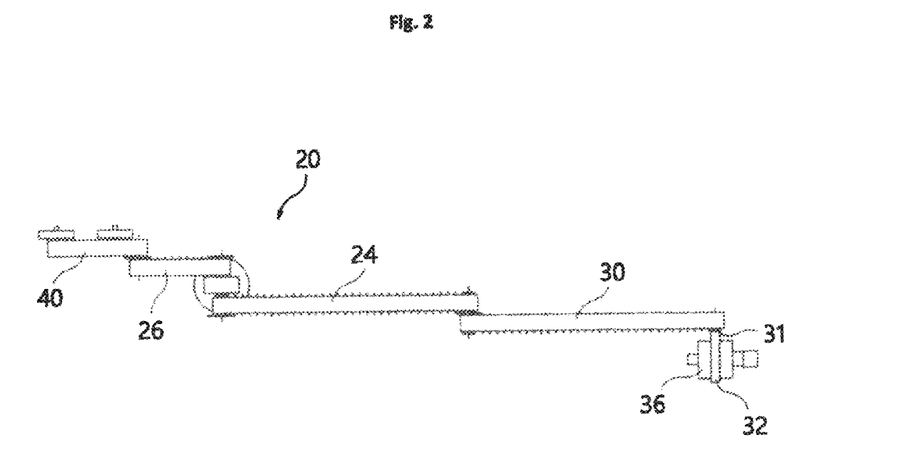
FIG. 2 the holding and moving device from FIG. 1 in plan view.

The pivot arms 30, 40 are secured at both ends of the bearing arm 20. The pivot arms 30, 40 are each attached at one of their ends rotatably to the respective end of the bearing arm 20. The first pivot arm 30 on the camera side has at its other end a camera holding device 32 at a suspension point 31 or V2, by means of which a camera 36 is attached to the holding and moving device 10. The camera holding device 32 preferably extends laterally at the end region of the pivot arm 30, as shown in FIG. 2, so that the camera 36 is arranged (e.g. in a plan view) next to the pivot arm 30. The camera 36 can also be attached below (see FIG. 1) or even directly below the suspension point 31.

Figure 4A:
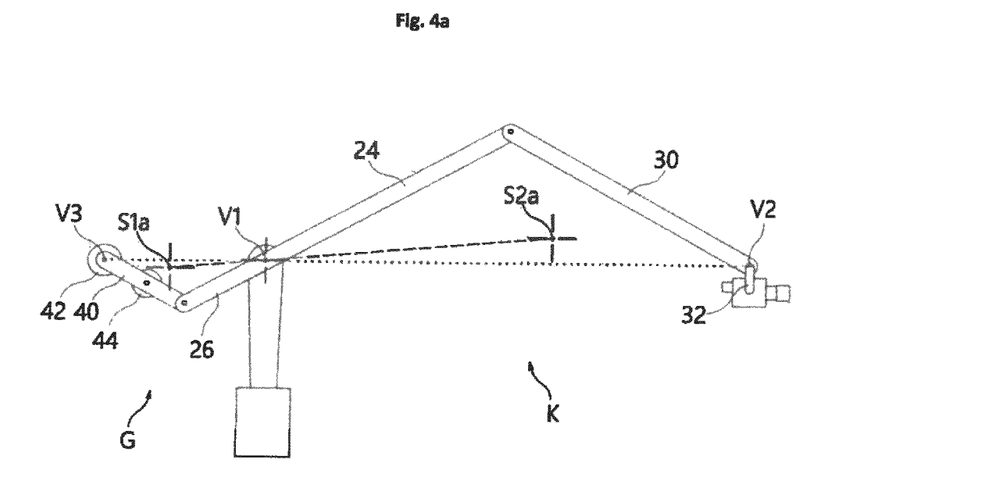
FIGS. 4a-c further embodiments of the holding and moving device according to the present invention.
Figure 4B:
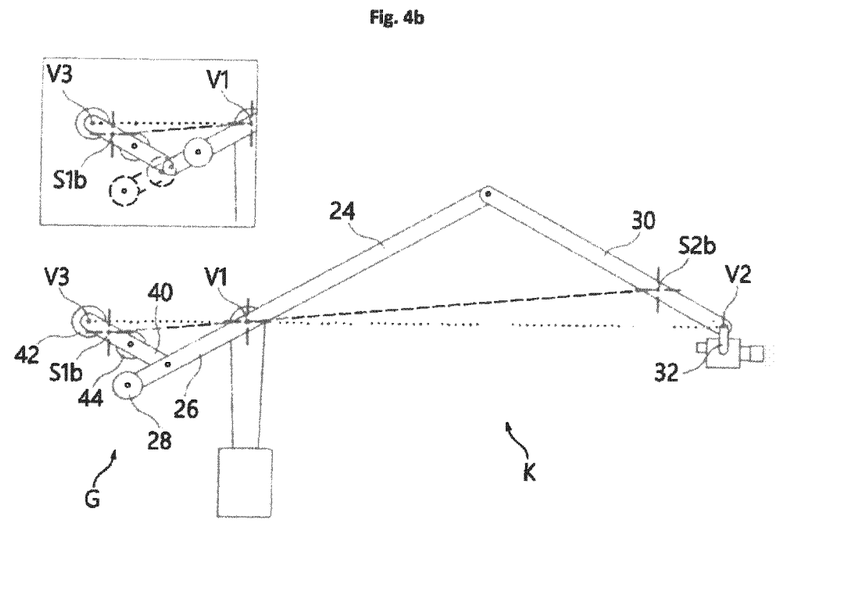
Figure 4C:
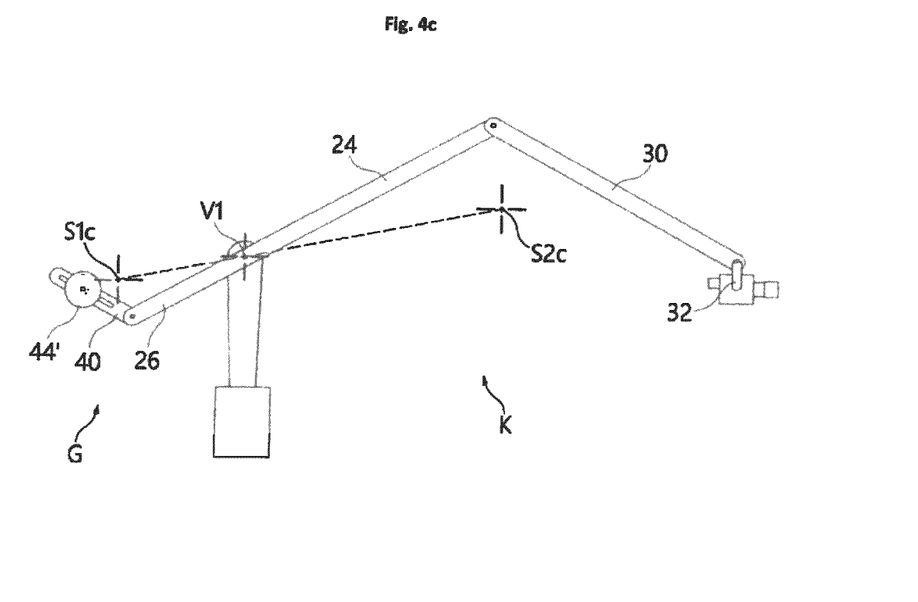
Figure 5:
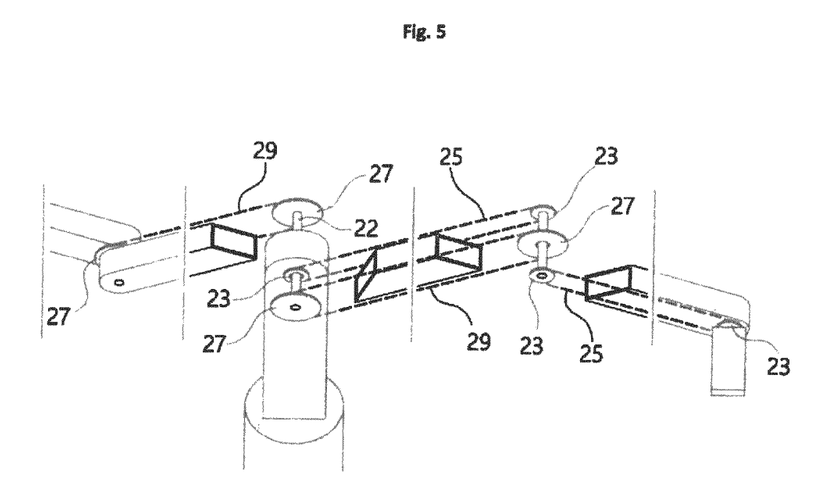
FIG. 5 an enlarged view of a mechanical rotational connection of the bearing arm and the pivot arms.

The second pivot arm 40 is arranged on the weight side. As shown in FIGS. 4a-4c, there are different embodiments of the second pivot arm 40 and of the weight-side part 26 of the bearing arm 20 which will be described in more detail below. It is important that the first and second pivot arm 30, 40 are kept parallel to one another. This is achieved by a parallel mechanism, for example a chain hoist, a cable hoist or toothed belt. In FIGS. 1 and 5 wheels 27 and chain hoist/belt 29 are shown schematically. When the camera 36 is moved forwards, backwards, upwards or downwards the first pivot arm 30 extends in the desired direction and transfers this movement to the second pivot arm 40, which then automatically moves accordingly at the same time so that the entire holding and moving device 10 including the camera 36 remains in balance. Likewise, the orientation of the camera 36 can also be determined in this manner. This balancing can also be performed by other mechanisms, for example by providing a plurality of electric motors instead of wheels 27, which are controlled together, or by a hydraulic system in which hydraulic drives are connected to one another and transfer the movement in a similar way to the chain drives. It is also possible that the bearing arm 20 and the pivot arms 30, 40 are formed by a parallel rod gear which ensures their parallelism. FIG. 5 shows an enlarged schematic representation of the parallel mechanism, by which the pivot arms can be moved in relation to one another. The camera holding device 32 is preferably controlled such that it balances the movement of the pivot arms 30, 40 and the bearing arm 20. This balancing is performed in particular by means of a separate mechanical, hydraulic or electromechanical control system similar to the systems used for the parallel mechanism of the pivot arms. FIG. 5 shows small wheels 23 and chains/belts 25 for this purpose. This parallel mechanism is connected in particular to the support foot 12. In the shown embodiment the connecting shafts of the parallel mechanism of the pivot arms and the mechanism for the camera compensation are arranged inside one another and are designed to be rotatable relative to one another. Thus the camera 36 can then also be held in a predetermined orientation during the movement.

Figure 3A:
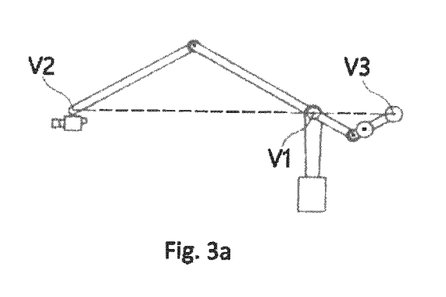
FIGS. 3a-c the holding and moving device from FIG. 1 in different positions in a side view.
Figure 3B:
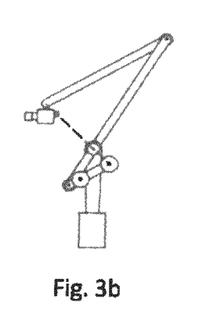
Figure 3C:
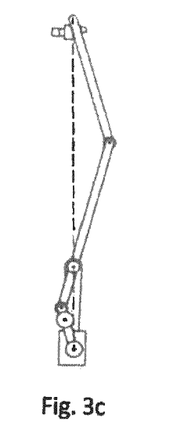

FIGS. 4a, 4b and 4c show three embodiments of the holding and moving device according to the present invention. FIG. 4a shows an embodiment, in which the second pivot arm 40 is adapted to provide dynamic balance. Here an additional weight on the second pivot arm 40 provides a balance weight 44 for the holding and moving device 10, so that the overall centre of gravity S1$a$ of the weight side G of the holding and moving device 10, the connecting point V1 of the bearing arm 20 and the support foot 12 and the overall centre of gravity S2$a$ of the camera side are essentially in a straight line in any position of the holding and moving device 10 (see dashed line in FIG. 4a). The balance weight 44 is used for balancing the construction, in particular the inherent weight of the camera-side bearing arm section 24, the first pivot arm 30 and the camera holding device 32. The overall centre of gravity S1$a$ of the weight side G is the result of the balance weight 44, the inherent weight of the second pivot arm 40 and the inherent weight of the weight-side bearing arm section 26. The overall centre of gravity S2$a$ of the camera side K is a result of the inherent weight of the camera holding device 32, the inherent weight of the first pivot arm 30 and the inherent weight of the camera-side bearing arm section 24. The balance weight 42 is then used to balance the weight of the camera 36. The overall centre of gravity S1$a$ of the weight side G can additionally also comprise the balance weight 42. The overall centre of gravity S2$a$ of the camera side K can additionally also comprise the inherent weight of the camera 36. The overall centres of gravity S1$a$ and S2$a$ then change their position, but remain essentially in a straight line in each position of the holding and moving device 10. Furthermore, the second pivot arm 40 further comprises a holding device for the balance weight 42 for the camera 36. In this embodiment, the holding point V3 for the balance weight 42, the connecting point V1 of the bearing arm 20 and the holding point V2 of the camera holding device 32 are also on a essentially straight line (see dotted line in FIG. 4a). This is the case in any position of the holding and movement device 10. The balance weight 44 can also be structurally integrated into the pivot arm 40, so that the pivot arm 40 and the balance weight 44 are designed in one piece (for example manufactured from one piece or welded to one another). FIGS. 3a, 3b and 3c show the holding and moving device 10 in different extreme positions, in which the balance of the overall system is still maintained. In addition, reference is made in particular to FIGS. 1 to 3 and the associated description, The embodiment shown in FIG. 4b is a more specific form of the first embodiment according to FIG. 4a. Here the weight-side section 26 of the bearing arm 20 can protrude beyond the connecting point to the second pivot arm 40. A counterweight 28 may also be attached to the weight-side section 26 of the bearing arm 20 to balance the bearing arm 20. The balance weight 28 is thus used to balance the inherent weight of the camera-side section 24 of the bearing arm 20. The detail in FIG. 4b shows a positioning variant of the balance weight 28. The position of the balance weights 28 can be determined according to the weight so that the weight of the camera-side section 24 of the bearing arm 20 is balanced by the weight-side section 26 of the bearing arm 20 and/or the balance weight 28. Thus the centre of gravity of the bearing arm 20 is at connecting point V1. The balance weight 44 on the second pivot arm 40 is then used to balance the weight of the first pivot arm 30 and the camera holding device 32. The balance weight 42 is used to balance the inherent weight of the camera 36. Thus the overall centre of gravity S1$b$ of the weight side G, the bearing point V1 of the bearing arm 20 on the support foot 12 and the overall centre of gravity S2$b$ of the camera side K are then essentially in a straight line (see dashed line in FIG. 4b). Furthermore, the overall centres of gravity S1$b$ and S2$b$ also lie on the respective pivot arms 30, 40. This also remains the case when the balance weight 42 for the camera 36 is attached, in addition, the connecting point V1 of the support foot 12 with the bearing arm 20, the suspension point V2 of the camera 36 and the suspension point V3 of the camera balance weight 42 are also essentially in a straight line (see dotted line in FIG. 4b). This embodiment according to FIG. 4b is simpler to calculate as the complexity of the balancing is reduced compared to the embodiment according to FIG. 4a. Firstly, the bearing arm 20 is balanced, then the two parallel pivot arms 30, 40 and then the camera 36. The overall centre of gravity S1$b$ of the weight side G is therefore a result of the balance weight 44 and the inherent weight of the second pivot arm 40. The overall centre of gravity S2$b$ of the camera side K results from the inherent weight of the camera holding device 32 and the inherent weight of the first pivot arm 30. The alignment of the holding points V2, V3 and the overall centre of gravity S1$b$, S2$b$ is analogous to that of FIG. 4a (see dashed and dotted lines in FIG. 4b). For further details, reference is made in particular to FIGS. 1 to 4a and the associated description.

With the embodiments according to FIGS. 4a and 4b, different cameras can be used with the same holding and moving device 10 and at the same time a essentially perfect balance can be maintained. Thus when changing the useful load the balance weight 42 can be easily determined and adjusted accordingly.

FIG. 4c shows a further embodiment, in which the weight balancing of the camera 32 is carried out at the same time as the weight balancing of the bearing arm 20 and the pivot arms 30, 40. In this embodiment the second pivot arm 40 is able to adjust a balance weight 44', shown here as a slot 48, in which the balance weight 44' can be moved along the second pivot arms 40 and fixed. Thus, a balancing of the weights can be adjusted for any camera. However, the displaceable weights also have to be adjusted to a changed camera. In principle, the displaceable balance weight 44' only replaces the balance weight 44 and the camera balance weight 42 described above. The specific position and the specific weight of the displaceable balance weight 44' is then selected and adjusted for each camera accordingly. The overall centre of gravity S1c of the weight side G of the holding and moving device 10, the connecting point V1 from the bearing arm 20 and support foot 12 and the overall centre of gravity S2a of the camera side K are essentially in a straight line in each position of the holding and moving device 10 (see dashed line in FIG. 4c). The overall centre of gravity S1c of the weight side G is here a result of the displaceable balance weight 44', the inherent weight of the second pivot arm 40 and the inherent weight of the weight-side bearing arm section 26. The overall centre of gravity S2c of the camera side K is a result of the inherent weight of the camera holding device 32, the inherent weight of the first pivot arm 30, the inherent weight of the camera-side bearing arm section 24 and the camera 36. In embodiments, such as for example the embodiment according to FIG. 4c, in which the inherent centre of gravity of the useful load 36 is perpendicular above or below the axis of the fastening point V2, the centre of gravity, as inherent centre of gravity, of the useful load 36 can be adopted and/or defined directly in the axis of the fastening point V2, in order to be able to perform the following calculations of the weights and distances. The centre of gravity or inherent centre of gravity of the useful load 36 can thus be defined, even with a vertical and/or horizontal deflection or attachment of the useful load 36, in the fastening point V2 of the useful load 36 on the first pivot arm 30. The camera 36 is included in the embodiment according to FIG. 4c in the overall centre of gravity of the camera side, because the balance weight 44' also has to balance the camera 36. In addition, reference is made in particular to FIGS. 1 to 4b and the associated description.

The calculation of the balance weights and their positioning in the embodiments according to FIGS. 4a-4c is explained in brief in the following with reference to FIGS. 6a-6c.

Figure 6A:
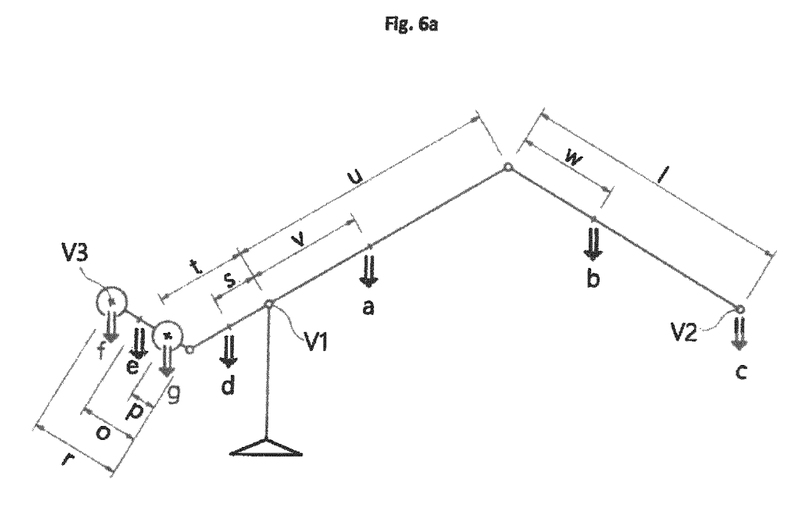
FIG. 6a-c schematic representations of different embodiments of the holding and moving device according to present invention with special relative dimensions.
Figure 6B:
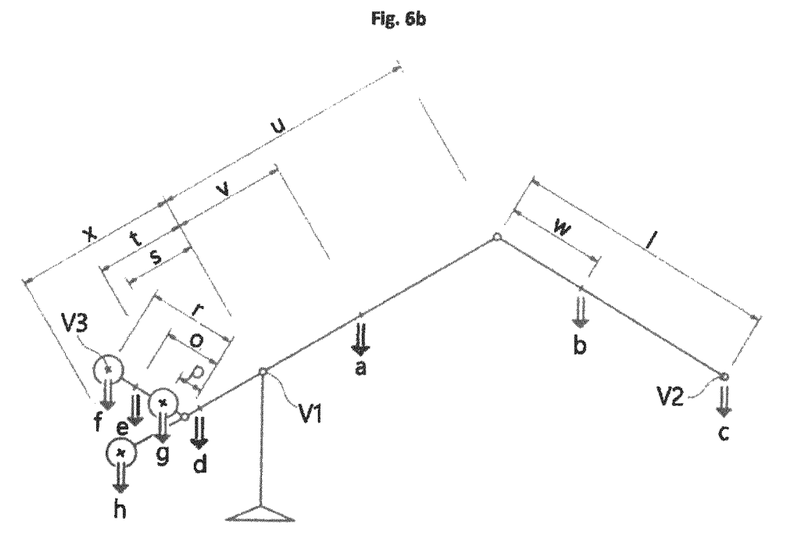
Figure 6C:
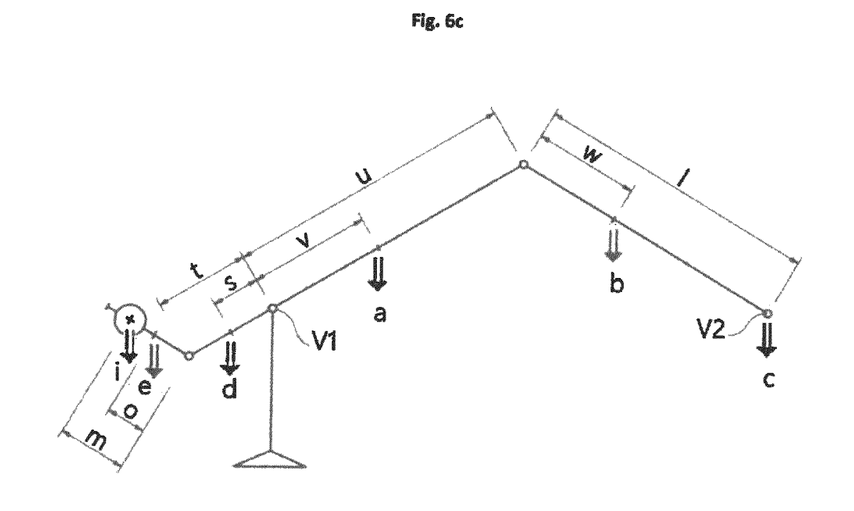

The definition of the individual parameters and variables for FIGS. 6a-c is:

a inherent weight of the useful load side/camera-side bearing arm section 24,
b inherent weight of the useful load side/camera-side first pivot arm 30, possibly with useful load holding device/camera holding device 32,
c inherent weight of the camera 36,
d inherent weight of weight-side bearing arm section 26,
e inherent weight of the weight-side second pivot arm 40,
f inherent weight of the balance weight 42 for balancing the useful load/camera 36,
g inherent weight of the balance weight 44 for compensating the inherent loads of the movable arms, in particular the useful load side/camera-side first pivot arm 30 and/or the useful load side/camera-side bearing arm section 24,
h inherent weight of the balance weight 28 for compensating the bearing arm, in particular the useful load side/camera-side bearing arm section 24,
i inherent weight of the balance weight 44 for compensating the inherent loads of the movable arms, in particular of the useful load side/camera-side first pivot arm 30 of the useful load side/camera-side bearing arm section 24, the useful load holding device/camera holding device 32 and/or the useful load/camera 36,
p distance of the weight-side articulation point to the centre of gravity and/or fastening point/attachment point of the balance weight (g), and/or distance of the fastening point/connecting point of the weight-side second pivot arm 40 on the bearing arm 20 to the centre of gravity and/or fastening point/attachment point of the balance weight (g) for balancing the inherent loads of the movable arms, in particular of the useful load side/camera-side first pivot arm 30 and/or of the useful load side/camera-side bearing arm-section 24,
m distance of the weight-side articulation point to the centre of gravity and/or fastening point/attachment point of the balance weight (i), and/or distance of the fastening point/connecting point of the weight-side second pivot arm 40 on the bearing arm 20 to the centre of gravity and/or fastening point/attachment point of the balance weight (i) for balancing the inherent loads of the movable arms, in particular the useful load side/camera-side first pivot arm 30 of the useful load side/camera bearing arm section 24, the useful load holding device/camera holding device 32 and/or the useful load/camera 36,
o distance of the weight-side articulation point to the centre of gravity, such as the centre of mass, of the weight-side second pivot arm 40, and/or distance of the fastening point/connecting point of the weight-side second pivot arm 40 on the bearing arm 20 to the centre of gravity, such as the centre of mass, of the weight-side second pivot arm 40,
s distance of the connecting point V1, such as fastening point V1 of the bearing arm 20, to the centre of gravity, such as centre of mass, of the weight-side bearing arm section 26,
t distance of the connecting point V1, such as fastening point V1 of the bearing arm 20, to the weight-side articulation point and/or distance of the connecting point V1, such as fastening point V1 of the bearing arm 20, to the fastening point/connecting point of the weight-side second pivot arm 40 on the bearing arm 20,
r distance of the weight-side articulation point to the centre of gravity and/or fastening point/attachment point of the balance weights (f), and/or distance of the fastening point/connecting point of the weight-side second pivot arm 40 on the bearing arm 20 to the centre of gravity and/or fastening point/attachment point of the balance weight (f) for balancing the useful load/camera 36,
u distance of the connecting point V1, such as fastening point V1 of the bearing arm 20, to the useful load side/camera-side articulation point, and/or distance of the connecting point V1, such as fastening point V1 of the bearing arm 20, to the fastening point/connecting point of the useful load side first pivot arm 30 on the bearing arm 20,
l distance of the useful load side/camera-side articulation point to the holding point V2, and/or distance of the fastening point/connecting point of the useful load side first pivot arms 30 on the bearing arm 20 to the centre of gravity and/or fastening point of the useful load/camera 36 and/or useful load holding device/camera holding device 32,
v distance of the connecting point V1, such as fastening point V1 of the bearing arm 20, to the centre of gravity, such as centre of mass, of the useful load side/camera-side bearing arm section 24,
w distance of the useful load side/camera-side articulation point to the centre of gravity, such as resulting centre of mass, of the useful load side/camera-side first pivot arm 30 possibly with useful load holding device/camera holding device 32, and/or distance of the fastening point/connecting point of the useful load side/camera-side first pivot arm 30 on the bearing arm 20 to the centre of gravity, such as centre of mass, of the useful load side/camera-side first pivot arm 30 possibly with useful load holding device/camera holding device 32,
x distance of the connecting point V1, such as fastening point V1 of the bearing arm 20, to the centre of gravity and/or fastening point/attachment point of the balance weight (h) and/or distance of the connecting point V1, such as fastening point V1 of the bearing arm 20, to the centre of gravity and/or fastening point/attachment point of the balance weight (h) for balancing the bearing arm 20, in particular the useful load side/camera-side bearing arm section 24.

The configuration of the individual elements of the different embodiments can then be calculated using the following formulae:

For the embodiment in FIGS. 1 to 4a and 6a:
provided that:

$$\frac{l}{u} = \frac{r}{t}$$

$$f = \frac{c \cdot u + c \cdot l}{r + t}$$

$$g = \frac{a \cdot v + b \cdot u - d \cdot s - e \cdot t}{t}$$

$$p = \frac{b \cdot t \cdot w - e \cdot o \cdot t}{a \cdot v + b \cdot u - e \cdot t - d \cdot s}$$

For the embodiment in FIGS. 4b and 6b:
provided that:

$$\frac{l}{u} = \frac{r}{t}$$

predetermined for x:

$$h = \frac{v \cdot a - d \cdot s}{x}$$

predetermined for h:

$$x = \frac{v \cdot a - d \cdot s}{h}$$

$$g = \frac{b \cdot u - e \cdot t}{t}$$

$$p = \frac{b \cdot t \cdot w - e \cdot o \cdot t}{b \cdot u - e \cdot t}$$

$$f = \frac{c \cdot u + c \cdot l}{r + t}$$

For the embodiment in FIGS. 4c and 6c:

$$i = \frac{a \cdot v + c \cdot u + b \cdot u - d \cdot s - e \cdot t}{t}$$

$$m = \frac{b \cdot t \cdot w + c \cdot l \cdot t - e \cdot o \cdot t}{a \cdot v + c \cdot u + b \cdot u - e \cdot t - d \cdot s}$$

These formulae can be used to calculate and construct the dynamic weight balancing for the holding and moving device 10.

Figure 7:
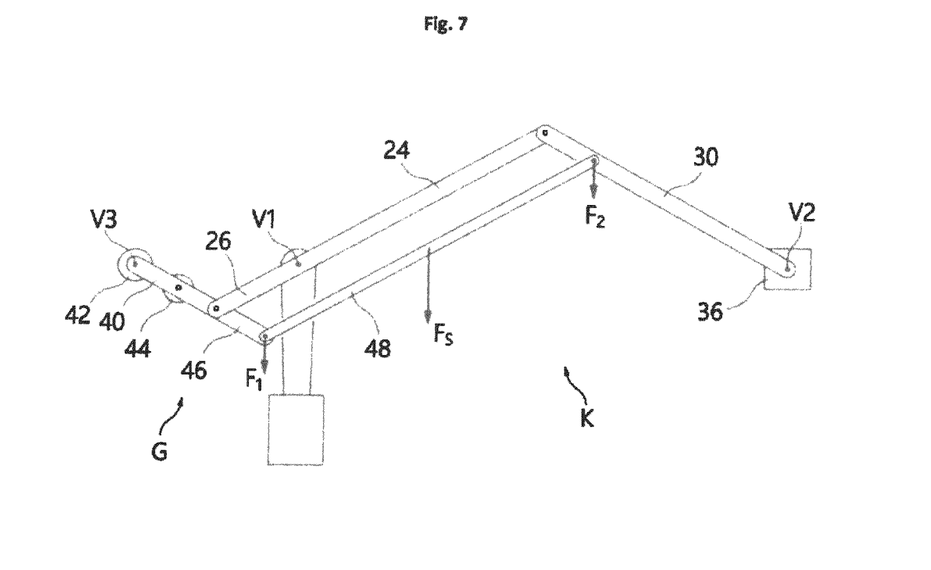
FIG. 7 a further embodiment of the holding and moving device according to the present invention.

FIG. 7 shows a further embodiment of the holding and moving device with further components of a parallelogram mechanism. Such a mechanism has further components which have to be included in the calculation formulae for the weight balancing. Such components have to be included in the inherent loads of the adjacent components. The added parts or sections 46, 48 for forming the parallelogram mechanism have to be taken into account and also affect the balance. The additional parallelogram rod 48 has a inherent weight and an inherent centre of gravity of force $F_S$. $F_S$ can thus represent the inherent weight of the parallelogram rod 48 in the inherent centre of gravity. This force or the inherent weight $F_S$ has to be broken down into two components which represent the holding force of the rod 48 at its ends. $F_S$ is here the sum von $F_1$ and $F_2$. A non-central centre of gravity is to be broken down inversely directly proportional to the distances/lengths of the inherent centre of gravity to the ends. The force or the weight $F_1$ is then assigned to the second pivot arm 40 as a weight component at the attachment point on the component 40 and affects its inherent weight and centre of mass. Similarly, the force or the weight $F_2$ is added to the first pivot arm 30 as a weight component at the attachment point and affects its inherent weight and centre of mass. The extended part 46 of the second pivot arm 40 is added to this. In addition, reference is made in particular to FIGS. 1 to 6c and the associated description.

Figure 8:
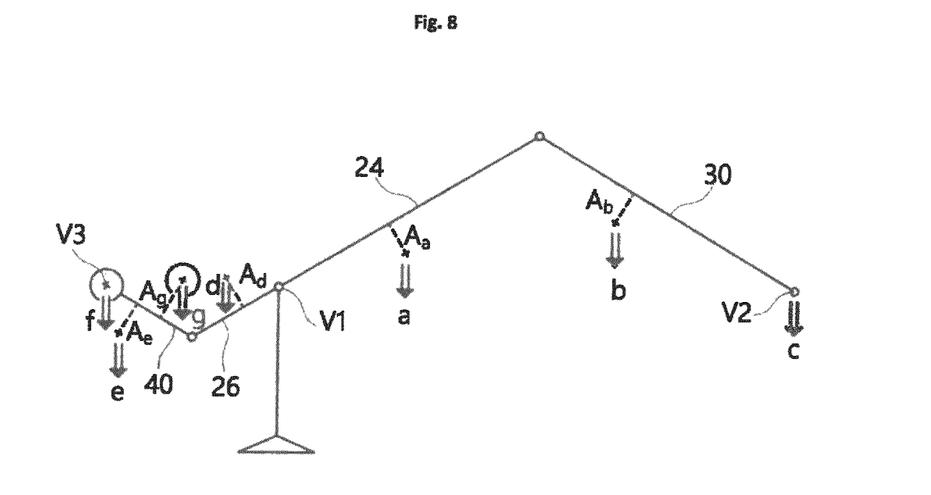
FIG. 8 schematically an exemplary embodiment with off-axial inherent load centres of gravity of movable arms.

FIG. 8 shows schematically an exemplary embodiment with off-axial inherent load centres of gravity of the movable arms. As shown above, the distances between the articulation points and the orientation of their connecting lines are essential for the basic geometric structure. The individual arms are used as structural connection of the articulation points but can be designed in any form. The calculation formulae already take into account that inherent centres of gravity of a component for example of the support arm 20 do not necessarily have to lie halfway between the ends of the component. However, they can lie on the imaginary connecting line between the articulation points. In order to allow full freedom of the design, components can also be designed with off-axis centres of gravity. In the exemplary embodiment shown in FIG. 8, the centres of gravity of the components/arms, for example of the first pivot arm 30, are located outside the connecting line between the articulation points of the respective component/arm. The distance to this line can be referred to off-axiality of the centre of gravity and is distance $A_a$, $A_b$, $A_d$, $A_e$ or $A_g$. The force or weight acting on these off-axis centres of gravity is a, b, d, e or g. The off-axialities of the inherent weights a and d of the support arm sections 24, 26 can be mutually balanced and described or defined by the formula $d^*A_d = a^*A_a$. The off-axialities of the inherent weights b and e can be balanced by the off-axiality of the counterweight g and described or defined by the formula $A_g = (b^*A_b + e^*A_e)/g$. The off-axiality of centres of gravity is considered differently for each embodiment. Basically, it can be said that the off axiality of the inherent weight centre of gravity of a component on the respective opposite component can be balanced by an opposite off-axiality of the counterweight. Thus for example by the front extension arm 30 on the rear extension arm 40 and/or by the front section 24 of the support arm 20 on the rear section 26 of the support arm 20. In addition, reference is made in particular to FIGS. 1 to 7 and the associated description.

Figure 9A:
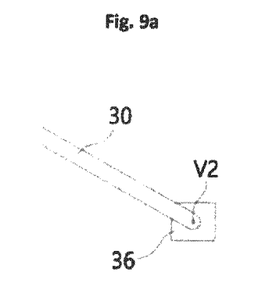
FIG. 9a a variant, in which a useful load inherent centre of gravity lies on the axis of the suspension point for the useful load.

FIG. 9a shows a variant, in which the useful load inherent centre of gravity lies on the axis of the suspension point V2 for the useful load 36. The useful load 36 is mounted so that its inherent centre of gravity lies on the axis of the suspension point V2 for the useful load 36 and/or directly at the suspension point V2. For determining the overall centre of gravity of the useful load site K in particular this positioning of the useful load 36 can be assumed or defined. This can also be the case if the useful load 36 and/or its inherent centre of gravity is actually attached or provided vertically and/or horizontally deflected. The position-independent balance is thus also achieved in this way. In the direction of the axis (in FIG. 9a perpendicular to the plane of the drawing) this can be offset.

Figure 9B:
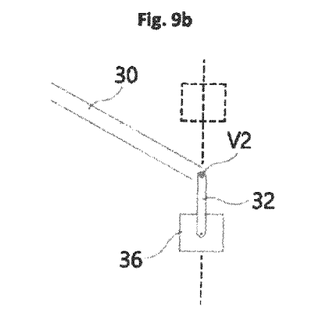
FIG. 9b a variant, in which the useful load inherent centre of gravity is independent of the position vertically below or vertically above the axis of the suspension point for the useful load.

FIG. 9b shows a variant, in which the useful load inherent centre of gravity is independent of the position vertically below or vertically above the axis of the suspension point V2 for the useful load 36. The useful load 36 and/or the holding device 32 for the useful load 36 can also be attached in such a way that its inherent centre of gravity is vertically above or vertically below the axis of the suspension point V2 for the useful load 36. It can be ensured that also in other positions of the first pivot arm 30, the position and/or alignment of the useful load 36 and/or the holding device 32 for the useful load 36 remains essentially unchanged in the vertical. For example, a rotation of the first pivot arm 30 can be compensated. This can be achieved for example by a corresponding mechanism, which couples the position and/or orientation of the useful load 36 and/or the holding device 32 for the useful load 36 about the axis V2 with the orientation of the support on the base point V1 of the support arm 20.

Figure 9C:
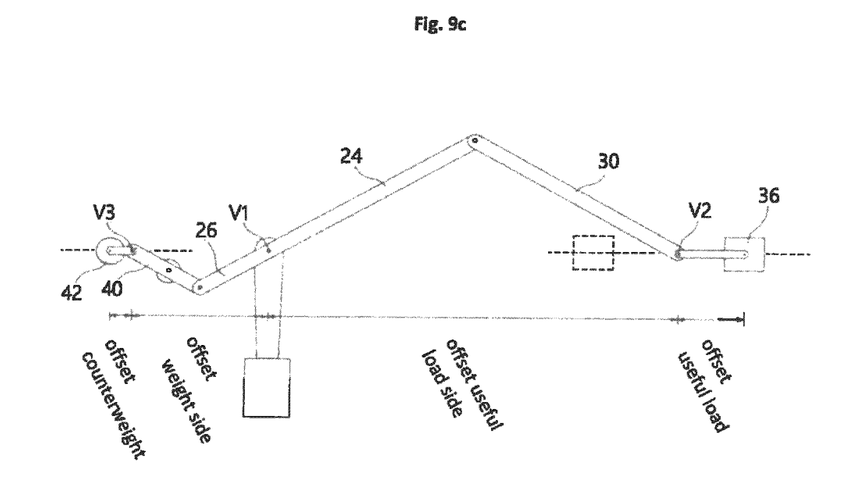
FIG. 9c a variant, in which the useful load inherent centre of gravity independent of the position is horizontally offset to the axis of the suspension point for the useful load.

FIG. 9c shows a variant, in which the useful load inherent centre of gravity independent of the position is horizontally offset to the axis of the suspension point V2 for the useful load 36. The useful load 36 and/or the holding device 32 for the useful load 36 can be attached so that its inherent centre of gravity is also displaced horizontally to the suspension point V2. The same mechanism for maintaining the position and/or alignment of the useful load 36 and/or the holding device 32 can be provided for the useful load 36, as in the aforementioned variant according to FIG. 9b, but so that the position and/or orientation of the useful load 36 and/or holding device 32 for the useful load 36 remains essentially unchanged in the horizontal direction. In addition, the counterweight 42 for the useful load 36 may be mounted displaced in the opposite horizontal direction. The counterweight 42 can be coupled additionally, in a manner similar to the coupling mechanism described above, in the position, orientation and/or rotation about the axis point V3 to the base support, as with the orientation of the support on the base point V1 of the support arm 20. The counterweight 42 can have the following horizontal counter displacement (offset counterweight)

$$\text{offset counterweight} = \frac{\text{offset weight side}}{\text{offset useful load side}} * \text{offset useful load}$$

The counterweight 42 does not necessarily need to be attached displaced in the opposite horizontal direction. The counterweight 42 and/or its centre of gravity can alternatively, for example as in the aforementioned embodiments, be arranged directly on the second pivot arm 40. To compensate for the torque the suspension point V2 caused by the horizontally displaced useful load 36, a parallel mechanism can be provided.

The parallel mechanism can be arranged on the first pivot arm 30 and/or on the useful load side section 24 of the bearing arm 20. The parallel mechanism can have for example the parallel mechanism described for FIG. 5. In this way the torque can be directed into the base support and/or into the support foot 12.

The variants according to FIGS. 9a, 9b and 9c can be combined with one another as desired.

"Can" refers in particular to optional features of the invention. Accordingly, there are also further embodiments and/or exemplary embodiments of the invention which additionally or alternatively have the respective feature or the respective features.

From the combinations of features disclosed herein, individual features can also be picked out and used in combination with other features to delimit the subject-matter of the claims, by ending any structural and/or functional connection that may exist between the features.

The invention claimed is:

1. A holding and moving device for a useful load, comprising:
    a support foot;
    a bearing arm secured pivotably onto the support foot at a first fastening point such as to define a useful load side section and a weight-side section;
    a first pivot arm connected on a useful load side to the useful load side section of the bearing arm at a first connecting point for attachment of the useful load and/or a holding device for the useful load at a second fastening point; and
    a second pivot arm connected on a weight side to the weight-side section of the bearing arm at a second connecting point for attachment of a balance weight at an attachment point,
    wherein the bearing arm, the first pivot arm and the second pivot arm are connected to one another such that an orientation of the first and second pivot arms are parallel to one another in each position, and
    wherein a centre of gravity of the weight-side comprises an inherent weight of the second pivot arm and a centre of gravity of the useful load side comprises an inherent weight of the first pivot arm and the centre of gravity of the weight side, the centre of gravity of the useful load side and the first fastening point of the bearing arm on the support foot lie on a straight line.

2. The holding and moving device of claim 1, wherein a ratio of a distance from the first connecting point to the second fastening point to a distance from the first fastening point to the first connecting point is equal to a ratio of a distance of the second connecting point to at least one of the centre of gravity and the attachment point to a distance of the first fastening point to the second connecting point.

3. The holding and moving device of claim 1, wherein the second pivot arm and/or the weight-side section of the bearing arm are designed such that a weight of the first pivot arm and/or the useful load side section of the bearing arm is balanced in each position of the holding and moving device.

4. The holding and moving device of claim 1, wherein a distance of the first connecting point to the second fastening point and a distance of the first fastening point to the first connecting point is of equal length or a distance of the first connecting point to the second fastening point is greater or smaller than a distance of the first fastening point to the first connecting point.

5. The holding and moving device of claim 1, wherein a distance of the second connecting point to the centre of gravity and/or attachment point of the balance weight on the second pivot arm and a distance of the first fastening point to the second connecting point is essentially of equal length or a distance of the second connecting point to the centre of gravity and/or attachment point of the balance weight on the second pivot arm is greater or smaller than a distance of the first fastening point to the second connecting point.

6. The holding and moving device of claim 1, wherein an overall centre of gravity of the weight side, an overall centre of gravity of the useful load side and the first fastening point are essentially in a straight line, in particular in each position of the holding and movement device.

7. The holding and moving device of claim 1, wherein the centre of gravity or overall centre of gravity of the weight side comprises an inherent weight of the second pivot arm, an inherent weight of the weight-side section of the bearing arm and/or the balance weight, and/or wherein the centre of gravity or overall centre of gravity of the useful load side comprises an inherent weight of the first pivot arm, an inherent weight of the useful load side section of the bearing arm, an inherent weight of the holding device for the useful load and/or an inherent weight of the useful load.

8. The holding and moving device of claim 1, wherein the second pivot arm includes a holding device for the balance weight for the useful load and/or a holding device for the balance weight for the first pivot arm and/or the useful load side section of the bearing arm.

9. The holding and moving device of claim 8, wherein at least one the of the holding device for the useful load and the holding device for the balance weight has an orientation which is controlled to balance a movement of the first and second pivot arms.

10. The holding and moving device of claim 8, wherein at least one of the holding device for the useful load and the holding device for the balance weight is designed as a lateral, vertical and/or horizontal extension arm.

11. The holding and moving device of claim 1, wherein the second pivot arm includes the balance weight which is predetermined as a function of the useful load.

12. The holding and moving device of claim 11, wherein the balance weight is securable in a variable position along the second pivot arm.

13. The holding and moving device of claim 1, wherein the second pivot arm includes the balance weight which is predetermined as a function of an inherent weight of the first pivot arm and/or of the useful load side section of the bearing arm.

14. The holding and moving device of claim 1, wherein the support foot is secured on a first longitudinal side of the bearing arm, with the first and second pivot arms being secured on opposite longitudinal sides of the bearing arm.

15. The holding and moving device of claim 1, wherein the bearing arm includes a plurality of elements, with the weight-side section of the bearing arm being formed relative to the support foot on an opposite side as the useful load side section of the bearing arm.

16. The holding and moving device of claim 1, wherein a centre of gravity and/or the second fastening point, a centre of gravity and/or the attachment point and the first fastening point lie essentially on a straight one, and/or wherein a centre of gravity of the first pivot arm, a centre of gravity of the second pivot arm and the first fastening point lie essentially on a straight line.

17. The holding and moving device of claim 1, wherein the first and second pivot arms and/or the bearing arm are connected by a force-transmitting mechanism for movement relative to another, the force-transmitting mechanism including a chain hoist, belt, wire rope, electric motor and/or hydraulic rotary drive.

18. The holding and moving device of claim 1, wherein the useful bad is a camera, such as a photo and/or video camera.

19. A holding and moving device for a useful load (36), comprising:
a support foot;
a bearing arm secured pivotably onto the support foot at a first fastening point such as to define a useful load side section and a weight-side section;
a first pivot arm connected on a useful load side to the useful load side section of the bearing arm at a first connecting point for attachment of the useful load and/or a holding device for the useful load at a second fastening point; and
a second pivot arm connected on a weight side to the weight-side section of the bearing arm at a second connecting point for attachment of a balance weight at an attachment point,
wherein the bearing arm, the first pivot arm and the second pivot arm are connected to one another such that an orientation of the first and second pivot arms are parallel to one another in each position, and
wherein a ratio of a distance from the first connecting point to the second fastening point to a distance from the first fastening point to the first connecting point is equal to a ratio of a distance of the second connecting point to at least one of the centre of gravity and the attachment point to a distance of the first fastening point to the second connecting point.

20. The holding and moving device of claim 19, wherein a centre of gravity of the weight side, the centre of gravity of the useful load side and the first fastening point of the bearing arm on the support foot lie essentially on a straight line.

21. The holding and moving device of claim 19, wherein the second pivot arm and/or the weight-side section of the bearing arm are designed such that a weight of the first pivot arm and/or the useful load side section of the bearing arm is balanced in each position of the holding and moving device.

22. A holding and moving device for a useful load, comprising:
a support foot;
a bearing arm secured pivotably onto the support foot at a first fastening point such as to define a useful load side section and a weight-side section;
a first pivot arm connected on a useful load side to the useful load side section of the bearing arm at a first connecting point for attachment of the useful load and/or a holding device for the useful load at a second fastening point; and
a second pivot arm connected on a weight side to the weight-side section of the bearing arm at a second connecting point for attachment of a balance weight at an attachment point,
wherein the bearing arm, the first pivot arm and the second pivot arm are connected to one another such that an orientation of the first and second pivot arms are parallel to one another in each position, and
wherein the second pivot arm and/or the weight-side section of the bearing arm are designed such that a weight of the first pivot arm and/or the useful load side section of the bearing arm is balanced in each position of the holding and moving device.

23. The holding and moving device of claim 22, wherein a ratio of a distance from the first connecting point to the second fastening point to a distance from the first fastening point to the first connecting point is equal to a ratio of a distance of the second connecting point to at least one of the centre of gravity and the attachment point to a distance of the first fastening point to the second connecting point.

24. The holding and moving device of claim 22, wherein a centre of gravity of the weight side, the centre of gravity of the useful load side and the first fastening point of the bearing arm on the support foot lie essentially on a straight line.

\* \* \* \* \*

UNITED STATES PATENT AND TRADEMARK OFFICE
CERTIFICATE OF CORRECTION

PATENT NO. : 11,953,810 B2
APPLICATION NO. : 17/612864
DATED : April 9, 2024
INVENTOR(S) : Andreas Lukas et al.

Page 1 of 1

It is certified that error appears in the above-identified patent and that said Letters Patent is hereby corrected as shown below:

In the Claims
In Column 17, Claim 16, Line 55 replace "one" with --line--.
In Column 17, Claim 18, Line 67 replace "bad" with --load--.

Signed and Sealed this
Eighteenth Day of June, 2024

Katherine Kelly Vidal
*Director of the United States Patent and Trademark Office*